United States Patent Office 3,544,881
Patented Dec. 1, 1970

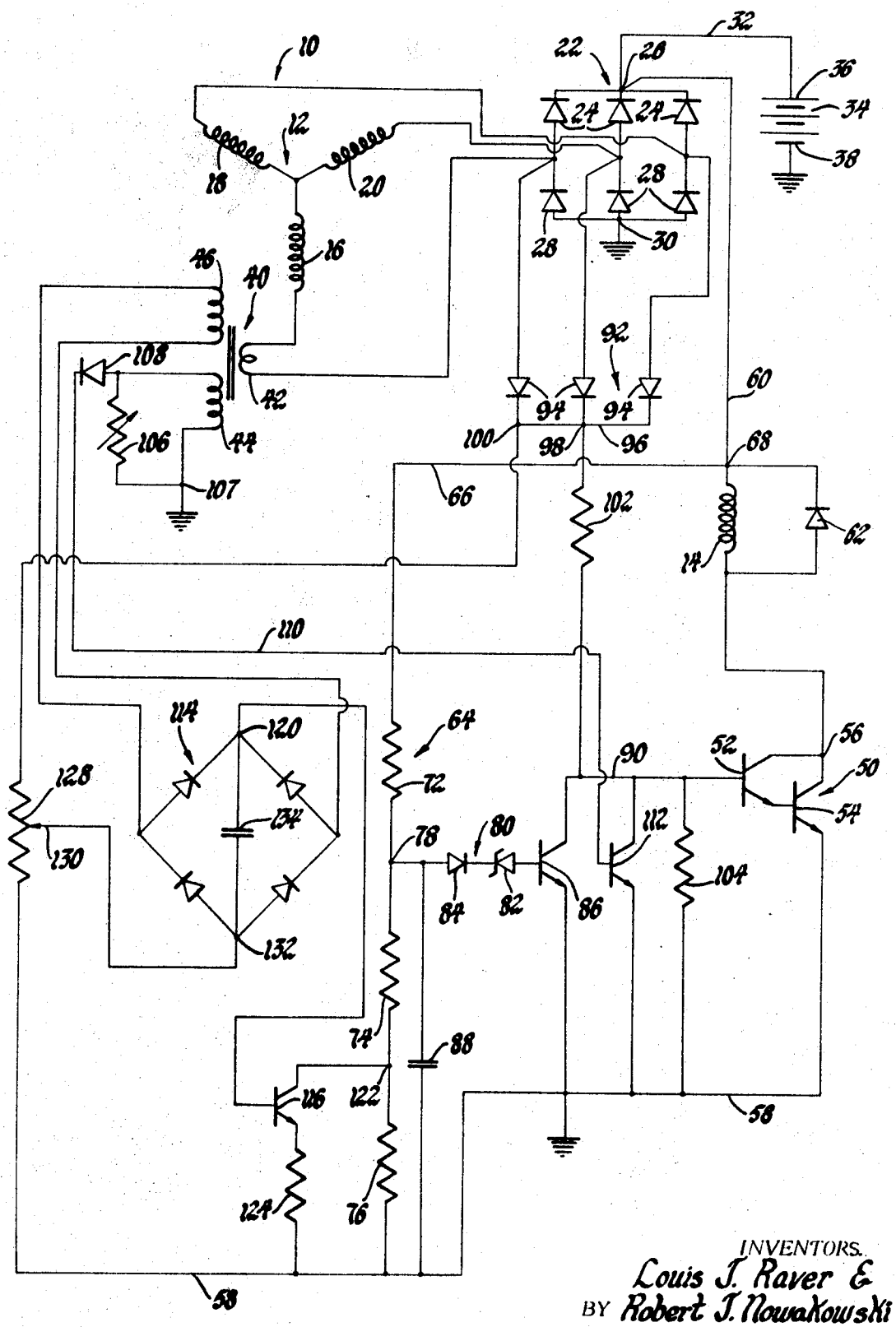

3,544,881
TRANSISTOR VOLTAGE AND CURRENT REGULATING SYSTEM FOR AN ALTERNATING CURRENT GENERATOR
Louis J. Raver, Anderson, and Robert J. Nowakowski, Indianapolis, Ind., assignors to General Motors Corporation, Detroit, Mich., a corporation of Delaware
Filed Sept. 11, 1968, Ser. No. 759,040
Int. Cl. H02p 9/30
U.S. Cl. 322—25                                   4 Claims

ABSTRACT OF THE DISCLOSURE

In a preferred embodiment, a regulating system for a generator having an output winding and a field winding is disclosed in which the generator output voltage is maintained within a certain range, is increased with increasing load current and is limited when the load current exceeds a predetermined value. The regulating system includes an output transistor which operates in a switching mode and which is controlled by first and second driver transistors. The first driver transistor is responsive to the voltage developed across a voltage sensing circuit and the second driver transistor is responsive to current developed by the generator. A current transformer is connected in series with the generator output to develop two control signals proportional to generator output current. The first driver transistor is controlled by the voltage output of a voltage divider sensing circuit having a portion thereof shunted by a control transistor that provides a variable impedance which varies linearly in response to one of the current transformer control signals. The amount of voltage developed across the voltage divider circuit varies as a function of the generator output current, thereby proportionally increasing the generator output voltage when the generator current rises. The second driver transistor is directly controlled by the second current transformer control signal so that the output transistor is biased nonconductive to maintain generator load current below a predetermined maximum value.

---

This invention relates to voltage and current regulators for generators and more particularly to an improved transistor voltage regulating system which is capable of limiting the maximum generator current and also controlling the generator voltage in accordance with changes in generator load current.

Many of the generators of the type utilized in electrical systems of automotive and heavy duty land vehicles include a transistor regulating system for controlling the generator output voltages or currents by controlling the amount of current supplied to the generator field winding, as is well known. Some of the alternating current generators used in such systems do not require current regulation because they are inherently self current-limiting. These alternators in vehicle applications are driven over a wide speed range, i.e. 5 to 1 up to 10 to 1, between the idle and maximum speeds of conventional gasoline and diesel engines. Therefore, to develop sufficient alternator current at the idle speeds, the alternator output winding includes a plurality of winding coils having several turns of relatively small size conductors. The large number of coil winding turns enable the alternator to develop higher currents at the lower or idle speeds but also develop substantial reactive impedance at high speeds to inherently limit the alternator output current. The regulating systems for these alternators require only a voltage regulator since they are self current-limiting.

When alternators are driven by engines having higher minimum speeds and smaller speed ratios, for example, by gas turbine engines which have a 2 to 1 speed ratio, the alternator output winding may include a fewer number of turns per coil winding. This is because the higher idle speed of a turbine engine, for example, will generate sufficient power in fewer coil winding turns. The alternator efficiency can be increased by using a larger coil winding conductor to reduce heat and resistance losses since fewer winding turns are required. However, as the alternator speed increases there is less impedance developed in the fewer turns of the ouput winding relative to the increase of generator output current. Current can rise so as to become excessive and a provision must be made in the regulator circuit to limit the maximum generator output current.

Also, it has become increasingly desirable and feasible to build regulating systems integral with the housing or frame of the generator so that the generator and its regulator are provided as a single unit. This permits simplification of the wiring because there is no external connection between the regulator and alternator. Also, a single cable conductor is used in connection with these systems to conduct the generator output to vehicle electrical loads, including a battery, which are connected between the cable and commonly grounded terminals. Since the battery may be mounted in a remote location several feet from the alternator, the voltage drop through the cable conductor may become significant as the load current through the cable increases. When the voltage is maintained substantially constant by a regulator sensing the voltage at the generator output terminal there are undesirable voltage variations at the battery charging terminal.

The voltage drop in the cable can reach approximately one-half volt at heavy load current conditions. Accordingly, it is desirable to raise the generator output voltage in proportion to increased generator load current so that the battery charging voltage may be maintained substantially constant. In one solution to this problem a compensating resistor is provided in series with the generator field winding and also in series with a voltage sensing circuit connected across the generator output voltage terminals. The compensating resistor adjusts the voltage sensed by the regulator to increase the generator output voltage with increased generator current. The compensating resistor produces additional electrical power losses in the generator field circuit and also produces a voltage drop that is substantially proportional to the field current which is not proportional to the generator output current at low generator driving speeds.

In the present invention, a regulating system for a generator having an output winding and a field winding is provided where the field winding current is controlled by an output transistor operating in a switching mode. The system includes a current transformer which senses the output current of one phase of an alternator polyphase output winding. First and second control voltages are produced by the current transformer which are proportional to the current developed in the alternator. The first control voltage controls a current regulating driver transistor connected across the input of the output transistor so that the output transistor is biased nonconductive when the generator current reaches a predetermined maximum current value. The other control voltage produced by the current transformer is applied through a rectifier circuit to the input of a control transistor. The control transistor is connected in parallel with a portion of a resistance voltage divider which senses the generator output voltage so that changes in generator current vary the voltage drop or impedance across the collector-emitter circuit of the control transistor. Accordingly, the generator voltage developed across the voltage divider output is varied proportionally to changes in generator current. The output of the voltage divider is applied to a voltage reference device and to the base of a voltage regulating driver transistor which controls the bias on the voltage output transistor. Increasing the conduction of the voltage divider control transistor decreases the voltage divider output so that the critical voltage of the voltage reference device is not reached until the generator output voltage is increased. Similarly, when the generator load current decreases the impedance of the voltage divider decreases so that the critical voltage of the voltage reference device is reached at a lower value of generator output voltage.

Accordingly, it is an object of this invention to provide a generator regulating system which will increase the generator output voltage with increasing generator load current.

A further object of this invention is to provide a voltage and current regulating system for an alternating current generator in which the maximum generator output current is limited in response to the output of a current sensing transformer connected in series with the A.C. current output of the generator.

A still further object of this invention is to provide an alternator voltage regulating system which provides a substantially constant battery charging voltage by compensating for cable voltage drop occurring between the alternator and the battery terminals. A current transformer is provided for producing a control voltage proportional to the generator output current to control a voltage responsive variable impedance device connected to the voltage sensing portion of the regulating system so that the sensed generator voltage is varied in accordance with generator current.

A still further object of this invention is to provide an alternating current generator which has a direct current output and a field winding controlled by switching the field winding current on and off in response to both the generator direct current output voltage and the generator A.C. current output and which is further responsive to a maximum generated current value. The field winding current is controlled by control signals from a current transformer to limit the maximum generator current and to provide a rising generator voltage with rising generator load current.

Further objects and advantages of the present invention will be apparent from the following description, reference being had to the accompanying drawing wherein a preferred embodiment of the present invention is clearly shown.

In the drawing:

The single figure drawing is a schematic illustration of a generator regulating system made in accordance with this invention.

Referring now more particularly to the drawing, a voltage source which takes the form of an alternating current generator 10 is illustrated for supplying vehicle electrical loads including a battery charging circuit. The alternating current generator 10, which is referred to hereinafter as an alternator, has an output winding 12 and a field winding 14 which develops a magnetic field which causes a voltage to be generated in output winding 12 generally in accordance with the amount of field winding current and speed of a prime mover, not shown, driving the generator. The output winding 12 includes coil conductors wound on a stator of the alternator 10 which are connected in a three-phase Y-connection formed by the individual phase windings designated 16, 18 and 20.

The alternator 10 is designed for use with a prime mover of the gas turbine engine type rather than the gasoline or diesel type and to be driven at a minimum speed of 3,000 r.p.m. and a top speed of approximately 6,000 r.p.m. Accordingly, the stator or output winding 12 formed by the phase windings 16, 18 and 20 is formed by a relatively few turns, two turns, for example, per stator coil winding. A more efficient alternator is provided because larger coil conductors having less resistance can be used rather than the smaller conductors of several coil winding turns. A larger number of coil turns is normally used to form the output windings of alternators designed to be driven by conventional automotive vehicle engines having lower minimum speeds and higher speed ratios.

The phase windings of the output winding 12 are respectively connected to the alternating current input of a power rectifier circuit 22 which includes six power silicon diodes connected in conventional three-phase full wave rectifier bridge arrangement. The three diodes 24 have their respective cathode electrodes connected to the junction 26 and the three diodes designated 28 have their anode electrodes connected to the junction 30 which is grounded as indicated in the drawing. The junction 26 provides the alternator direct current output which is connected to a cable conductor 32 that supplies a positive D.C. potential relative to ground to respective load circuits. The respective load circuits include a storage battery 34 having a positive terminal 36 and a negative terminal 38 which is also grounded as indicated in the drawing. Additional direct current loads (not shown) are connected between the cable conductor 32 and ground.

Referring now to the generator regulating system of this invention, a current transformer 40 having a primary winding 42 and secondary windings 44 and 46, is provided. The primary winding 42 of transformer 40 is connected in series with the phase winding 16. Accordingly, the current transformer 40 senses the A.C. output current of the alternator 10 between the phase winding 16 and one A.C. input terminal of the power rectifier circuit 22. The current transformer 40, as well as the rest of the regulating system of this invention, is mounted within a housing portion integral with the frame of alternator 10. Therefore, the cable conductor 32 and the grounded connection form the only external circuit connections to the generator 10.

The regulating system controls a semiconductor switching device 50, referred to hereinafter as an output transistor which operates in a switching mode and is formed by a pair of NPN transistors designated respectively 52 and 54 which are connected in a conventional Darlington circuit arrangement. The collectors of the respective transistors 52 and 54 are connected together at junction 56 and to one end of field winding 14. The emitter of transistor 52 is directly connected to the base of transistor 54. The output transistor 50 and field winding 14 are series connected across the output terminals of bridge rectifier 22 between junction 26 and conductor 58. This circuit includes conductor 60 which connects one end of the field winding 14 to junction 26. Accordingly, the field winding 14 is supplied with current by the direct current voltage output of the alternator provided by the rectifier circuit 22.

The output transistor 50 is rendered conductive or nonconductive in response to the potential applied to the base electrode of transistor 52 which forms the input to output transistor 50. The transistors 52 and 54 function with a compound effect as a single switching device and produce an improved switching operation and an increased amplification gain over the use of a single transistor. Accordingly, the output transistor 50 is operated as a switching device to control the current supplied to the field winding 14 from the generator output voltage developed between junction 26 and conductor 58. A field discharge diode 62 is connected across the field winding 14. The diode 62 provides a current path to circulate the reactive current which is produced by the self-induced voltage developed in the field when the field winding current is switched off.

The voltage control circuit of the regulating system includes a voltage divider 64 which is connected between junction 26 and conductor 58 by conductor 66, junction 68 and conductor 60. The voltage divider includes series connected resistors 72, 74 and 76 connected between conductors 66 and 58. The voltage sensed by the regulating system is taken between junction 78 and conductor 58.

The voltage control circuit further includes a voltage reference means generally designated 80 including a Zener diode 82, a temperature compensating silicon diode 84 and an NPN transistor designated 86. The transistor 86 is also referred to as a driver transistor which is operated as a transistor switching device and which, as will become more apparent hereinafter, controls output transistor 50.

A filter capacitor 88 is connected between the junction 78 and the conductor 58. The capacitor 88 limits the amount of voltage ripple applied to Zener diode 82 from junction 26. Accordingly, a smooth D.C. voltage is applied across the series connection of temperature compensating diode 84 and Zener diode 82. The anode of diode 84 is connected to the junction of filter capacitor 88 and junction 78 of the voltage divider. The cathode of diode 84 is connected to the cathode of Zener diode 82. The Zener diode has a critical reverse breakdown voltage characteristic which varies with changes in ambient temperature. The diode 84 has a forward voltage breakdown characteristic which varies with changes in temperature and in a manner inverse to the temperature breakdown characteristics of Zener diode 82. Because of this, diode 84 compensates for changes in breakdown voltage of Zener diode 82 with changes in temperature. The anode of the Zener diode is connected to the base electrode of the driver transistor 86. The Zener diode 82 is poled so that when the critical breakdown voltage is reached the driver transistor 86 is forward biased to conduction in its collector-emitter circuit. The emitter of transistor 86 is connected to the conductor 58 and the collector electrode is connected to a conductor 90 connected to the base electrode of transistor 52 forming the control input of the output transistor 50.

The electrical system of this invention includes an auxiliary rectifier circuit 92 comprised of three small silicon diodes 94. The anodes of diodes 94 are connected to the respective junctions between pairs of the diodes 24 and 28 of the power rectifier circuit such that diodes 94 and 28 form a three phase full-wave bridge having direct current output provided on conductor 96. The conductor 96 is connected to the cathodes of diodes 94 and includes a pair of junctions 98 and 100. One circuit path through the auxiliary rectifier circuit 92 is from the output of generator phase windings, a diode 94 of auxiliary rectifier circuit 92, through junction 98, a resistor designated 102, and to the conductor 90. The path is completed through the collector-emitter circuit of transistor 86 to the grounded conductor 58, through the grounded junction 30 of the power rectifier circuit, the diodes 28 of the power rectifier circuit and back to the generator phase windings. The potential of the conductor 90, which is provided by the output of the auxiliary rectifier circuit 92, is sufficient to forward bias the output transistor 50 conductive and thereby operatively connect the field winding 14 across the direct current voltage provided by the power rectifier circuit when the output voltage is below a desired regulated value. A bias resistor designated 104 is connected between the base electrode of transistor 52 and the grounded conductor 58 to forward bias transistor switch 50 when the voltage at conductor 90 is at a predetermined value. When the driver transistor 86 is biased conductive, the low voltage drop across the collector-emitter circuit causes the potential of conductor 90 to drop below the value sufficient to maintain the output transistor 50 conductive.

Having described the basic voltage control circuit portion of the regulator, the load current regulating portion and the arrangement for providing a generator voltage rise with load current increase will now be described. The secondary windings 44 and 46 of the current transformer 40 produce control signals which are proportional to generator load current and these are utilized to respectively provide current regulation and a rising voltage with increasing load current. The secondary winding 44 produces a voltage which is proportional to the current of phase winding 16 and this voltage is applied across a variable resistor 106 and grounded junction 107. A diode 108 produces a half-wave rectified voltage signal between conductor 110 and ground which is a function of the voltage developed across resistor 106 and this signal is referred to hereafter as a first control signal.

The system of this invention includes a second NPN driver transistor 112 having a base electrode connected to conductor 110 and collector and emitter electrodes respectively connected across conductors 90 and 58 and thereby across the input control circuit of the output transistor 50. The first control signal is developed between conductor 110 and ground and is proportional to the generator load current. The generator current develops a voltage value determined by the number of turns of winding 44 and the resistance of resistor 106 which forward biases the transistor 112 to conduction when the load current reaches a predetermined maximum value. A low impedance path is now provided through the collector-emitter circuit of transistor 112 and the potential appearing on conductor 90 is lowered to substantially the ground potential of conductor 58. The voltage of conductor 90 is lowered to a point where the output transistor is biased off and the field winding current is interrupted.

In one preferred embodiment the voltage developed across resistor 106 is adjusted so that when the generator load current reaches approximately 75 amperes the driver transistor 112 is biased conductive to thereby turn off the field winding current and reduce the generator output voltage and current.

The voltage rise with increase of generator load current is controlled by a second control signal voltage produced by the current transformer secondary winding 46. A single phase full wave diode rectifier bridge designated 114 is connected across the output of the secondary winding 46. An NPN transistor 116, referred to hereinafter as control transistor, has a base electrode connected to the positive D.C. output terminal 120 of the rectifier bridge 114. The collector electrode of control transistor 116 is connected to the junction 122 between voltage divider resistors 74 and 76. The emitter electrode of transistor 116 is connected through a resistor 124 to the grounded conductor 58. The resistor 124 provides stability in the operation of the transistor 116 which is operated in the class A amplifier mode. The resistor 124 provides sufficient load in the collector-emitter circuit so that the gain of transistor 116 is substantially reduced and the transistor 116 provides a linearly variable impedance element responsive to the forward biasing voltage between its base and emitter electrodes.

A variable resistor 128 is connected in series between the junction 100 of the auxiliary rectifier circuit 92 and the grounded conductor 58 and includes a slider tap 130. The resistor tap 130 is connected to the negative D.C. output terminal 132 of the full wave rectifier circuit 114. A filter capacitor 134 is connected across the rectifier bridge terminals 120 and 132. Voltage applied to the base electrode of transistor 116 from bridge terminal 120 is the sum of the rectified voltage of transformer winding 46 and the voltage developed between resistor tap 130 and ground.

The voltage developed by resistor 128 provides a voltage between tap 130 and ground which biases the base-emitter circuit of control transistor 116 in the linear operating region for class A amplifier operation. Increasing generator current increases the voltage developed in the secondary winding 46 and the forward bias voltage increases across the base-emitter circuit of transistor 116. When the forward bias voltage of control transistor 116 increases, the collector-emitter circuit correspondingly becomes more conductive to lower the impedance between the collector and emitter electrodes. Therefore, current increases through the voltage divider circuit causing an increased voltage drop across resistor 72 and less voltage drop between junction 78 and ground to increase the regulated output voltage.

The regulating system of the invention is energized when the alternator 10 is driven at a sufficient speed so that residual magnetism of the alternator produces an output voltage on the auxiliary rectifier conductor 96 sufficient to forward bias the input of the output transistor 50 so that it is biased conductive. Generator field current is thereby provided by the voltage appearing between junction 26 and ground. The voltage developed across the voltage divider 64 and provided at the junction 78 is initially below the breakdown voltage of the Zener diode 82 and accordingly the driver transistor 86 is nonconductive. The generator current initially developed through current transformer 40 is low and therefore the voltage developed in secondary winding 44 is below the necessary voltage to bias the driver transistor 112 conductive.

The generator output voltage continues to increase and the voltage sensed by the regulating system which occurs at junction 78 correspondingly increases until the critical breakdown voltage of the Zener diode is reached. The critical Zener breakdown voltage is proportional to the desired regulated generator voltage and when the reverse current begins in Zener diode 82, the driver transistor 86 becomes forward biased to the fuly conductive state. The collector-emitter circuit of transistor 86 provides a low impedance circuit path across the input of output transistor switch 50 and the forward biasing potential is lowered to substantially the potential of grounded conductor 58 and it becomes biased nonconductive. Accordingly, the field winding current is switched off and the voltage developed in the generator output winding 12 decreases. The above-described operation provides the generator voltage regulation and for a static generator load current level the operation described above is repeated at a substantially high rate and repetitive switching of the field winding current occurs.

As the output current of the generator 10 increases, for example by connecting additional electrical loads across the generator output, the increased load current produces an increased voltage drop between the junction 26 and the positive charging terminal of the battery 34. Accordingly, if the output voltage of the generator remains constant, increasing load current causes a decrease of terminal voltage at the battery 34. The battery charging voltage must be maintained substantially constant so that damage to the battery and shortened battery lifetime is avoided. Therefore, when the generator load current increases the current flowing through the primary winding 42 of current transformer 40 is increased and an increased voltage is developed in the secondary winding 46. The signal voltage applied to rectifier bridge 114, which is proportional to generator load current, increases such that the potential developed at the base of amplifier transistor 116 increases the forward biasing of the transistor. This forward biasing voltage increases linearly with increase of generator current and the resistance between the voltage divider output junction 78 and conductor 58 proportionally decreases, as noted hereinabove, for a given amount of generator current. The output voltage developed by the generator must be increased to raise the potential at junction 78 to the critical breakdown voltage of the Zener diode 82. Accordingly, the voltage developed by the generator increases by the output transistor switch 50 being forward biased and conducting field current for a longer time. The generator output voltage builds up to a higher desired output level to compensate for the voltage drop occurring in the cable conductor 32.

While the desired generator output voltage is adjusted with variations in load in accordance with the operation described above, the generator output current may increase to a level which can damage either the diodes of the power rectifier circuit 22 or the generator. Therefore, the driver transistor 112 is forward biased when the control signal voltage developed in the secondary winding 44 of the current transformer 40 reaches a value which is proportional to the predetermined maximum generator current level. The transistor 112 is forward biased so that it is conductive in its collector-emitter circuit to lower the forward biasing voltage being applied to the input of the output transistor switch 50 in the same manner as does the driver transistor 86 which is responsive to the generator output voltage.

It is understood, of course, that both transistors 86 and 112 may be biased conductive at the same time or that either one or the other may be biased conductive so that the output transistor switch 50 will be switched off. Also, it is to be understood that the maximum load current regulating arrangement and the generator voltage rise with load increase arrangement may be used together in a regulating system as described hereinabove, or that either of the two features may be incorporated with a voltage regulating system without the other feature.

While the embodiment of the present invention disclosed hereinabove constitutes a preferred form, it is understood that other forms may be adopted.

What is claimed is as follows:

1. A regulating system for an alternating current generator comprising; an alternating current generator including a polyphase output winding and a field winding, a power rectifier circuit connected to said polyphase output winding having direct current output terminals, a semiconductor switching means having a base-emitter circuit and a pair of output terminals, said output terminals of said semiconductor switching means connecting said field winding across said generator output winding, a voltage divider having first and second resistors connected in series across said direct current output terminals, said voltage divider including a junction intermediate said first and second resistor for developing a voltage proportional to the voltage produced by said generator polyphase output winding and said voltage divider further including a voltage responsive variable impedance control device connected across said first resistor, a driver transistor having base, collector and emitter electrodes, the collector-emitter circuit of said driver transistor connected across the base-emitter circuit of said semiconductor switching means, a voltage reference means connected between said junction of said voltage divider and the base-emitter circuit of said driver transistor so that said driver transistor is biased conductive when the voltage developed at said voltage divider junction is above a predetermined value, said semiconductor switching means being biased conductive when said driver transistor is biased nonconductive and said semiconductor switching means being biased nonconductive when said driver transistor is biased conductive, a current transformer having a primary winding and a secondary winding, means connecting said primary winding with at least one phase winding of said polyphase output winding, said secondary winding producing a control voltage having a magnitude which is a function of the generator load current, circuit means connecting said secondary winding to said voltage responsive variable impedance control device so that the impedance of said control device is varied as a function of the magnitude of said control voltage for producing a change in said voltage developed at said voltage divider junction so that an increase of said control voltage produces a change which is opposite to the change which is produced when the voltage across said voltage divider increases, whereby said semiconductor switching means is controlled so as to produce an increase in the generator output voltage with increasing load current thereby compensating for changes in voltage applied across a generator load resulting from changes in the generator load current.

2. A regulating system for a three phase alternator comprising; an alternator having an output winding and a field winding, a full wave power rectifier circuit connected across the alternator output winding having direct current load terminals, an output transistor having base, emitter and collector electrodes, means connecting the collector-emitter circuit of said output transistor and said field winding in series across the direct current load terminals of said full wave power rectifier circuit, a voltage divider circuit including a plurality of resistors connected across said direct current load terminals for developing a voltage proportional to the voltage developed by said generator, an auxiliary rectifier circuit, means connecting said auxiliary rectifier circuit with at least one portion of said full wave power rectifier circuit and the base-emitter circuit of said output transistor, a driver transistor, a Zener diode, means connecting said Zener diode between said voltage divider and the base-emitter circuit of said driver transistor, said Zener diode operable in response to the voltage developed by said voltage divider to bias said driver transistor conductive when the voltage developed by said voltage divider is above a predetermined value to thereby bias said output transistor nonconductive when the alternator output voltage rises above a desired value, a transformer having a primary winding connected in series with the output winding of said alternator and having at least one secondary winding for producing a voltage proportional to the current generated in said alternator, a third transistor having base, collector and emitter electrodes, the collector-emitter circuit of said third transistor including a resistor, means connecting the collector-emitter circuit of said third transistor across one of said voltage divider resistors, control means including a third rectifier circuit having input terminals connected across said secondary winding and output terminals, said control means further including a source of voltage, means connecting said source of voltage in series with the output terminals of said third rectifier circuit and the base-emitter circuit of said third transistor so that the impedance of the collector-emitter circuit of said third transistor is varied in accordance with voltage developed in said secondary winding and thereby the impedance of said voltage divider is varied proportionally with variation of generator current, whereby said regulating system maintains the desired voltage output of said alternator such that the voltage across said direct current load terminals is increased in response to increase of alternator load current.

3. A regulating system for an alternating current generator comprising; an alternating current generator having an output winding and a field winding, a full wave power rectifier circuit connected across the generator output winding having direct current load terminals, an output transistor having base, collector and emitter electrodes, means connecting the collector-emitter circuit of said output transistor and said field winding in series across the direct current load terminals of said power rectifier circuit, a voltage divider circuit including a plurality of resistors connected across said direct current load terminals, said voltage divider developing a voltage that is proportional to the voltage developed by said generator, an auxiliary rectifier circuit, means connecting said auxiliary rectifier circuit with at least one portion of said full wave power rectifier circuit and in a series circuit including said generator output winding and the base-emitter circuit of said output transistor, first and second transistors having base, emitter and collector electrodes, a voltage responsive means connected between said voltage divider and the base-emitter circuit of said first transistor, said voltage responsive means operable in response to the voltage developed by said voltage divider to bias said first transistor conductive when the voltage divider voltage is above a predetermined value and operable to bias said first transistor nonconductive when said voltage divider voltage is below said predetermined value, a transformer having a primary winding connected in series with the output winding of said alternating current generator and having at least two secondary windings for producing voltages proportional to the current generated in said alternating current generator, a third transistor, means connecting the collector-emitter circuit of said third transistor in parallel with one of said voltage divider resistors, control means including a third rectifier circuit, said third rectifier circuit including alternating current input terminals connected across one of said secondary windings and direct current output terminals, said control means further inculding a source of voltage connected in series with the direct current output terminals of said third rectifier circuit and the base-emitter circuit of said third transistor so that the conductivity of said second transistor is varied linearly in accordance with voltage developed in said one secondary winding, whereby said voltage developed by said voltage divider circuit is varied proportionally with the variation of generator current, means connecting the collector-emitter circuits of said first and second transistors in parallel and across said base-emitter circuit of said output transistor, the base-emitter circuit of said second transistor connected across the other of said secondary windings so that said second transistor is biased conductive when the current developed in said alternating current generator is above a predetermined current value, said output transistor being biased conductive when both of said first and second transistors are nonconductive and said output transistor being biased nonconductive when either of said first and second transistors are biased conductive, whereby said regulating system maintains a desired voltage output of said alternating current generator such that the voltage across said direct current load terminals is increased in response to increase of generator load current and the output current of said alternating current generator is limited to a predetermined maximum load current value.

4. A voltage and current regulating system for an alternating current generator, comprising: an alternating current generator having a polyphase output winding and a field winding; a power diode bridge rectifier circuit having input terminals connected to each phase winding of said generator output winding and direct current output terminals; an output trasistor having a base-emitter input circuit, said output transistor having a collector-emitter circuit which is biased between conductive and nonconductive states, said collector-emitter circuit of said output transistor connecting said generator field winding in a series circuit including said direct current output terminals of the power diode bridge rectifier circuit; an auxiliary diode bridge rectifier circuit connected across said input terminals of the power diode bridge rectifier circuit, said auxiliary diode bridge rectifier circuit having an output connected across the base-emitter input circuit of said output transistor; a voltage divider circuit having plural resistors connected in series across said direct current output terminals and including a junction between two of said plural resistors for providing a voltage proportional to the voltage developed across said direct current output terminals; current transformer means having input terminals and at least two secondary windings; means connecting said input terminals of said current transformer in series with at least one phase winding of said output winding and one of the input terminals of said power diode bridge rectifier circuit so that said secondary windings develop control signals having voltage values proportional to generator load current; first and second driver transistors each having base, collector and emitter electrodes, the collector-emitter circuits of said first and said second driver transistors being respectively connected in parallel with the base-emitter input circuit of said output transistor such that the collector electrodes of each of said driver transistors is directly connected to the base electrode of said output transistor; a fourth transistor having base, emitter and collector electrodes; means including a resistor connecting the collector-emitter circuit of said fourth transistor across one of said voltage divider resistors; a third rectifier circuit including a full wave diode bridge circuit, said third rectifier bridge circuit having input terminals connected across one of said transformer secondary windings and first and second direct current output terminals; means connecting the base-emitter circuit of said fourth transistor to said first output terminal of said third rectifier circuit; resistor means; means connecting said resistor means across the output of said auxiliary diode bridge rectifier circuit; means connecting at least a portion of said resistor means to said second output terminal of said third rectifier circuit and in series with the base-emitter circuit of said fourth transistor whereby the voltage applied across the base-emitter circuit of said fourth transistor is the sum of the rectified control signal of said one transformer winding and the voltage developed across said portion of said resistor means, the impedance of said collector-emitter circuit of said fourth transistor being varied in accordance with variation of the voltage developed in said one secondary winding to correspondingly vary the impedance of said voltage divider circuit with changes in generator load current; a Zener diode; means connecting said Zener diode between said voltage divider junction and said base electrode of said first driver transistor so that said first driver transistor is biased respectively conductive or nonconductive when the voltage developed at said voltage divider junction is respectively above or below a predetermined value; means including a resistor connected across the other of said secondary transformer windings and a diode connected in series with one end of said other secondary winding for producing a half wave rectified control signal dependent upon the magnitude of generator load current; means connecting the base electrode of said second driver transistor to the last named means for producing a half wave control signal whereby said second driver transistor is biased conductive when the load current of said generator exceeds a predetermined maximum value and nonconductive when the load current is below the predetermined maximum value; said output transistor being biased nonconductive when either of said first or second driver transistors are biased conductive so that the generator output voltage is maintained at a predetermined regulated value which increases with increasing load current and the maximum generator load current is maintained below a predetermined value.

References Cited

UNITED STATES PATENTS 3,173,074   3/1965   Domann   322—28
3,290,582   12/1966   Roosma et al.   322—25

ORIS L. RADER, Primary Examiner

H. HUBERFELD, Assistant Examiner

U.S. Cl. X.R.
322—27, 28, 73